US 6,712,603 B2

United States Patent
Pettit

(10) Patent No.: US 6,712,603 B2
(45) Date of Patent: Mar. 30, 2004

(54) MULTIPLE PORT CATALYTIC COMBUSTION DEVICE AND METHOD OF OPERATING SAME

(75) Inventor: William H. Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/213,641

(22) Filed: Aug. 7, 2002

(65) Prior Publication Data

US 2004/0029057 A1 Feb. 12, 2004

(51) Int. Cl.$^7$ ............................. F23D 3/40; F23D 21/00
(52) U.S. Cl. ............................................. 431/7; 431/170
(58) Field of Search ........................... 431/7, 170, 326, 431/328

(56) References Cited

U.S. PATENT DOCUMENTS

| | | | |
|---|---|---|---|
| 3,938,326 A | | 2/1976 | DeCorso et al. |
| 4,375,949 A | * | 3/1983 | Salooja ........................... 431/7 |
| 4,731,989 A | | 3/1988 | Furuya et al. |
| 5,623,819 A | | 4/1997 | Bowker et al. |
| 5,628,181 A | | 5/1997 | Kraemer |
| 5,664,942 A | | 9/1997 | Bayer |
| 5,725,964 A | | 3/1998 | Huppmann |
| 5,837,205 A | | 11/1998 | Bayer et al. |
| 6,000,212 A | * | 12/1999 | Kolaczkowski et al. ...... 60/776 |
| 6,213,757 B1 | * | 4/2001 | Kushch et al. .................. 431/7 |
| 6,224,370 B1 | * | 5/2001 | Tomizawa et al. .......... 431/326 |
| 6,386,862 B1 | * | 5/2002 | Fujita et al. ................. 431/170 |

* cited by examiner

*Primary Examiner*—Alfred Basichas
(74) *Attorney, Agent, or Firm*—Cary W. Brooks; Linda M. Deschere

(57) ABSTRACT

A catalytic combustor contains multiple sections for catalytically combusting an anode effluent. The anode effluent is divided into a plurality of portions with each portion routed to a different section or stage of the combustor. The proportioning of the anode effluent allows the combustor to be operated so that the flows combusted do not autoignite and various heat loads placed on the different stages of the combustor can be met. Additionally, the proportioning of the anode effluent allows the temperature within the various components of the combustor to be controlled so that a useful life of the combustor can be increased.

19 Claims, 4 Drawing Sheets

MULTIPLE PORT CATALYTIC COMBUSTION DEVICE AND METHOD OF OPERATING SAME

FIELD OF THE INVENTION

The present invention relates to catalytic combustion devices, and more specifically, to catalytic combustion devices that combust an anode effluent containing unused hydrogen ($H_2$) and a cathode effluent containing an unused oxidant, such as oxygen ($O_2$) or air, to produce heat.

BACKGROUND OF THE INVENTION

Catalytic combustion devices are employed in a variety of applications. A typical application involves the use of the catalytic combustion device to combust left over fuels that are contained within effluents exhausted from a power system within which the catalytic combustion device is employed. The power systems within which the present invention can be employed use a fuel source, such as hydrogen ($H_2$) and an oxidant source, such as oxygen ($O_2$) and/or air ($O_2$ admixed with nitrogen ($N_2$)) to produce electrical power. The creation of electrical power within the power system results in effluents that are exhausted from the power system. The effluents typically contain unused fuel in the form of $H_2$ and unused oxidant in the form of $O_2$ and/or air. These effluents represent a source of energy that can be used. To extract the energy from the effluents, these power systems typically employ a catalytic combustion device that combusts the unused $H_2$ contained within the effluent to produce heat that can be used within the power system to meet a heat demand.

The amount of $H_2$ contained within the effluent will vary depending upon the efficiency of the power system and the conditions under which the power system is operated. Because the amount of $H_2$ contained within the effluent varies, the catalytic combustion device typically includes a liquid fuel supply that can be used to increase the amount of combustible fuel within the combustion device so that heat demands placed on the combustion device by the power system can be met. Additionally, because the amount of $H_2$ contained within the effluent varies, the amount of reaction occurring in any particular area within the combustion device can also vary and result in hot spots or locations of excessive heat that can damage the combustion device. The effluents and any liquid fuel flowing into the combustion device are a flammable fuel mixture. The temperature at which the fuel mixture will autoignite will vary depending upon the composition of the fuel mixture.

Conventional combustion devices are designed to preclude autoignition of the fuel mixture. When autoignition of the fuel mixture within some areas occurs, the combustion device typically is damaged and possibly completely destroyed. In one solution to the autoignition concern, the fuel mixture is passed through a high density foam structure, prior to entering the area of the combustion device where the catalytic reaction is occurring and excessive heat build up can occur. The high density foam structure induces mixing as well as producing a high velocity exit gas. As long as the velocity of the combustible fuel mixture exiting the high density foam structure is greater than the fuel mixture flame speed and the material is below the autoignition temperature, the fuel mixture upstream of the high density foam structure will not ignite. That is, the high density foam structure acts as a flame arrestor and prevents flame propagation across the high density foam structure.

While the use of the high density foam structure may prevent flame propagation to an undesirable area in the combustion device, the high density foam structure produces a significant pressure drop as the fuel mixture flows through the high density foam structure. The pressure drop is undesirable because it may require the effluents flowing into the combustion device to pass through additional equipment to increase the pressure of the effluents prior to entering the combustion device so that adequate pressure and flow of the effluents through the combustion device is achieved. The extra equipment to pressurize the fuel flow increases the complexity and cost of the system within which the combustion device is employed.

Therefore, it would be desirable to provide a combustion device that does not require the use of a flame arrestor or reduces the density of the flame arrestor so that the pressure drop across the flame arrestor is smaller and does not require the effluents to flow through any additional equipment prior to entering the combustion device. Additionally, it would be desirable to provide a combustion device that can utilize a liquid fuel injection system to provide a fuel to the combustion device so that the combustion device can meet a heat demand of the power system during the start up operation of the power system where the amount of effluent being exhausted by the power system may not be sufficient to meet the heat demand of the power system.

SUMMARY OF THE INVENTION

The present invention is directed to a catalytic combustion device that diminishes and/or eliminates the need for a flame arrestor within the combustion device. This is accomplished by splitting the $H_2$ containing effluent exhausted by the power system into a plurality of flows and injecting the plurality of flows in multiple locations along the combustion device. The injection of the flows are controlled so that the fuel mixture within the combustion device is at a concentration that has an autoignition temperature that is above the operating temperature of the various sections of the combustion device. The present invention also provides a method of operating such a combustion device. The invention further discloses a method of starting up the combustion device when the flow of $H_2$ within the anode effluent is not sufficient to meet the heat demand placed on the combustion device.

The catalytic combustion device of the present invention comprises a first section that receives an oxidant feed stream and a first portion of an anode effluent stream. The oxidant feed stream and the first portion of the anode effluent stream mix together in the first section to form a first stage flow stream. There is a second section downstream from the first section. The second section has a first catalyst bed. The second section receives the first stage flow stream from the first section and directs the first stage flow stream through the first catalyst bed. There is a third section downstream from the second section. The third section receives the first stage flow stream from the second section. The third section also receives a second portion of the anode effluent stream. The first stage flow stream mixes with the second portion of the anode effluent stream in the third section to form a second stage flow stream. There is a fourth section downstream from the third section. The fourth section has a second catalyst bed. The fourth section receives the second stage flow stream from the third section and directs the second stage flow stream through the second catalyst bed.

The present invention discloses a method of operating a catalytic combustor that combusts a flow of an anode effluent. The method includes the steps of: 1) proportioning an anode effluent flow into a plurality of portions; 2) supplying a first portion of the anode effluent flow to a first stage of the combustor; 3) supplying an oxidant feed stream to the first stage of the combustor; 4) mixing the first portion of the anode effluent flow and the oxidant feed stream in the first stage of the combustor to form a first stage flow; 5) reacting the first stage flow within a first catalyst bed as the first stage flow passes through the first catalyst bed; 6) passing the first stage flow to a second stage of the combustor that is downstream of the first stage; 7) supplying a second portion of the anode flow to the second stage of the combustor; 8) mixing the second portion of the anode flow with the first stage flow within the second stage of the combustor to form a second stage flow; and 9) reacting the second stage flow within a second catalyst bed as the second stage flow passes through the second catalyst bed.

The present invention also discloses a method of starting a catalytic process within a catalytic combustor with a liquid fuel until a sufficient flow of anode effluent is available. The method includes the steps of: 1) supplying a liquid fuel flow to the combustor in a quantity sufficient to meet a heat demand of a known magnitude placed on the combustor; 2) supplying an oxidant feed stream to the combustor; 3) mixing the liquid fuel and oxidant feed stream together in the combustor to form a fuel/oxidant flow; 4) vaporizing the fuel/oxidant flow with a heating element within the combustor as the fuel/oxidant flow passes therethrough; 5) reacting the vaporized fuel/oxidant flow in a primary catalyst as the vaporized fuel/oxidant flow passes through the primary catalyst so that the combustor generates heat to meet the heat demand; 6) exhausting the reacted fuel/oxidant flow from the combustor; and 7) maintaining the supplying of the liquid fuel flow to the combustor until the combustor is supplied with an anode effluent flow of a magnitude capable of allowing the combustor to meet the heat demand without the liquid fuel flow.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
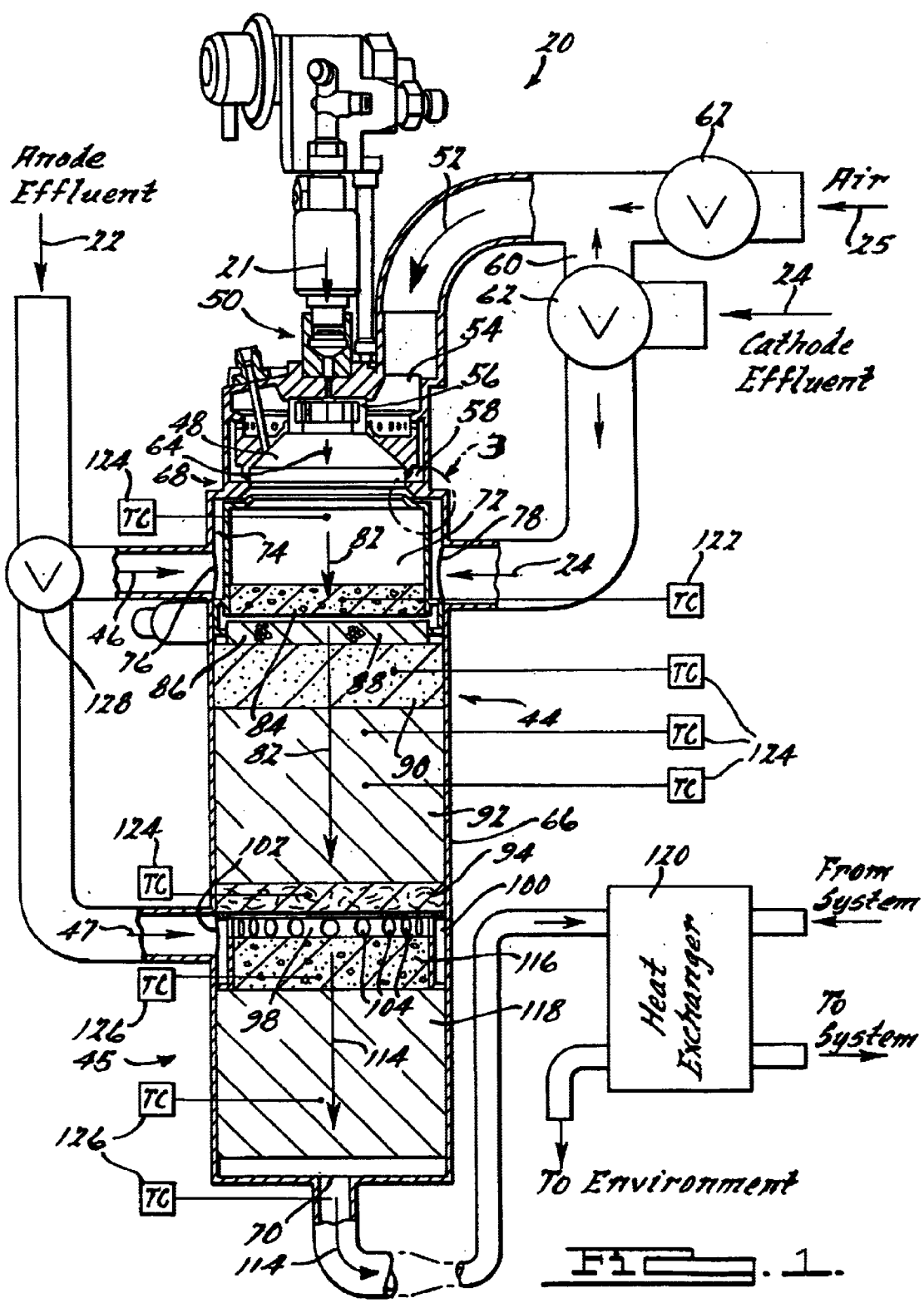
FIG. 1 is a cross-sectional view of a combustor according to a first preferred embodiment of the present invention.

Shown in FIG. 1 is a combustor 20 in accordance with the principles of the present invention can catalytically combust liquid fuel 21, anode effluent 22, or liquid fuel 21 in combination with anode effluent 22. The combustor 20 is designed to combust liquid fuel 21 and/or anode effluent 22 catalytically with an oxidant, such as cathode effluent 24 and/or air 25 while maintaining a controlled combustion process. By controlling the combustion process, the temperature throughout the combustor 20 can be controlled, different heat loads placed on the combustor 20 can be met, and flammable or thermal combustion can be minimized and/or prevented, as will be described below. To accomplish this, the combustor 20 is divided into a plurality of stages in which catalytic combustion occurs. Each stage receives a different fuel flow so that the catalytic combustion within each stage can be controlled, different heat loads placed upon the different stages of the combustor can be met, and flammable combustion within each of the stages can be minimized and/or prevented.

Figure 5:
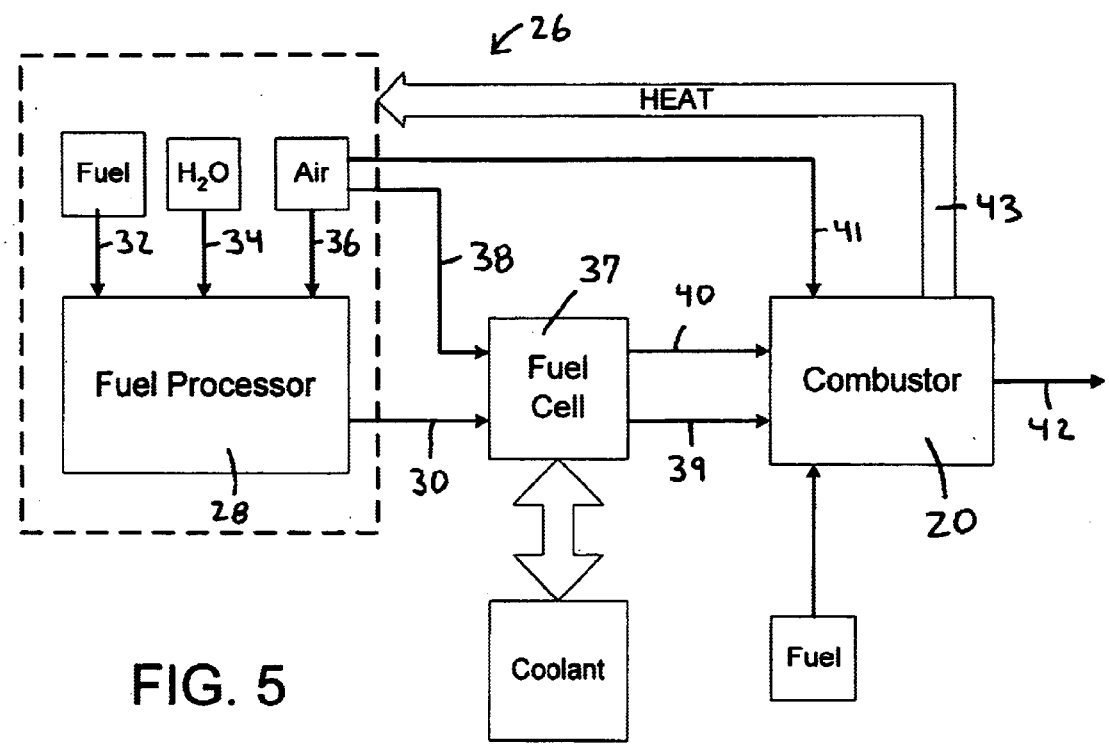
FIG. 5 is a schematic representation of a typical system in which the combustor of the present invention can be employed.

The source of the fuels that the combustor 20 combusts depends upon the system within which the combustor 20 is employed. For example, as can be seen in FIG. 5, the combustor 20 can be employed as part of a fuel cell system 26. The fuel cell system 26 shown in FIG. 5 is a generic fuel cell system whose operation, for exemplary purposes, will now be discussed.

In fuel cell system 26, a hydrocarbon fuel is processed in a fuel processor 28, for example, by reformation and partial oxidation processes, to produce a reformate gas 30 which has a relatively high hydrogen content on a volume or molar basis. Therefore, reference is made to hydrogen-containing or relatively high hydrogen content. The hydrogen-containing reformate can be made from a variety of sources, including hydrocarbon fuels such as methanol, ethanol, gasoline, alkaline, or other aliphatic or aromatic hydrocarbons.

As shown in FIG. 5, the fuel cell system 26 includes a fuel processor 28 for catalytically reacting a reformable hydrocarbon fuel stream 32 and a water stream 34 in the form of steam. In some fuel processors, air is also used in a combination partial oxidation/steam reforming reaction. In this example, fuel processor 28 also receives an air stream 36. The fuel processor 28 contains one or more reactors wherein the reformable hydrocarbon fuel in stream 32 undergoes dissociation in the presence of steam from stream 34 and air from stream 36 to produce the hydrogen-containing reformate which is exhausted from the fuel processor 28 as reformate stream 30. The fuel processor 28 typically also includes one or more downstream reactors, such as a water gas shift and/or preferential oxidizer reactors which are used to reduce the levels of carbon monoxide in the reformate stream 30 to acceptable levels, for example, below 20 ppm. The hydrogen-containing reformate stream 30 is fed through an anode chamber of a fuel cell stack 37. At the same time, oxygen in the form of air stream 38 is fed into a cathode chamber of the fuel cell stack 37. The hydrogen from the reformate stream 30 and the oxygen from the air stream 38 react in the fuel cell stack 37 to produce electricity.

Anode effluent is exhausted from the anode side of the fuel cell stack 37 in the form of anode effluent stream 39 which typically contains unreacted hydrogen. Cathode effluent is exhausted from the cathode side of the fuel cell stack 37 in the form of cathode effluent stream 40 which may contain unreacted oxygen. These unreacted gases represent additional energy which can be recovered in the form of thermal energy for various heat requirements within the fuel cell system 26. The anode effluent 39 can be combusted catalytically in the combustor 20 with oxygen provided to the combustor 20 from air in stream 41 and/or the cathode effluent stream 40 depending on system operating conditions. The combustor 20 discharges an exhaust stream 42 to the environment and the heat 43 generated thereby may be directed to the fuel processor 28 or other components of the fuel cell system 26, as needed.

While FIG. 5 shows the combustor 20 being used as part of a fuel cell system 26, it should be understood that the combustor 20, according to the principles of the present invention, is not limited to use solely in a fuel cell system 26. The combustor 20 of the present invention can be used in other fuel reforming systems that produce a hydrogen feed stream and have a given heat requirement. The combustor 20 mixes the anode effluent 39 with an oxidant, such as a cathode effluent 40 or air in stream 41 and is catalytically combusted to produce heat. For example, the combustor 20 according to the principles of the present invention can be used with an adsorption exhaust and/or liquid fuel, a membrane exhaust and/or liquid fuel, or other sources of unused hydrogen, as will be apparent to those skilled in the art.

The combustor 20, according to the principles of the present invention, is divided into a plurality of stages in which catalytic combustion occurs. For example, as shown in FIG. 1, the combustor 20 is divided into first and second stages 44, 45. The first stage 44 of the combustor 20 is upstream of the second stage 45. The anode effluent 22 that supplies unreacted $H_2$ to the combustor 20 is divided into a plurality of anode effluent flows 46, 47. There is an anode effluent flow for each stage of the combustor 20. For example, as shown in FIG. 1, the anode effluent 22 is separated into a first portion 46 and a second portion 47. The anode effluent 22 is separated into the plurality of anode effluent flows depending upon the operation of combustor 20, as will be described in more detail below. While the combustor 20 is shown and discussed as being divided into first and second stages 44, 45, it should be understood that the combustor 20 can be divided into more than two stages that each contain a catalyst and each receive one of the plurality of anode effluent flows depending upon the application in which the combustor 20 is employed. Therefore, it should be understood that the combustor 20 according to the principles of the present invention, is not limited solely to first and second stages 44, 45.

Figure 2:
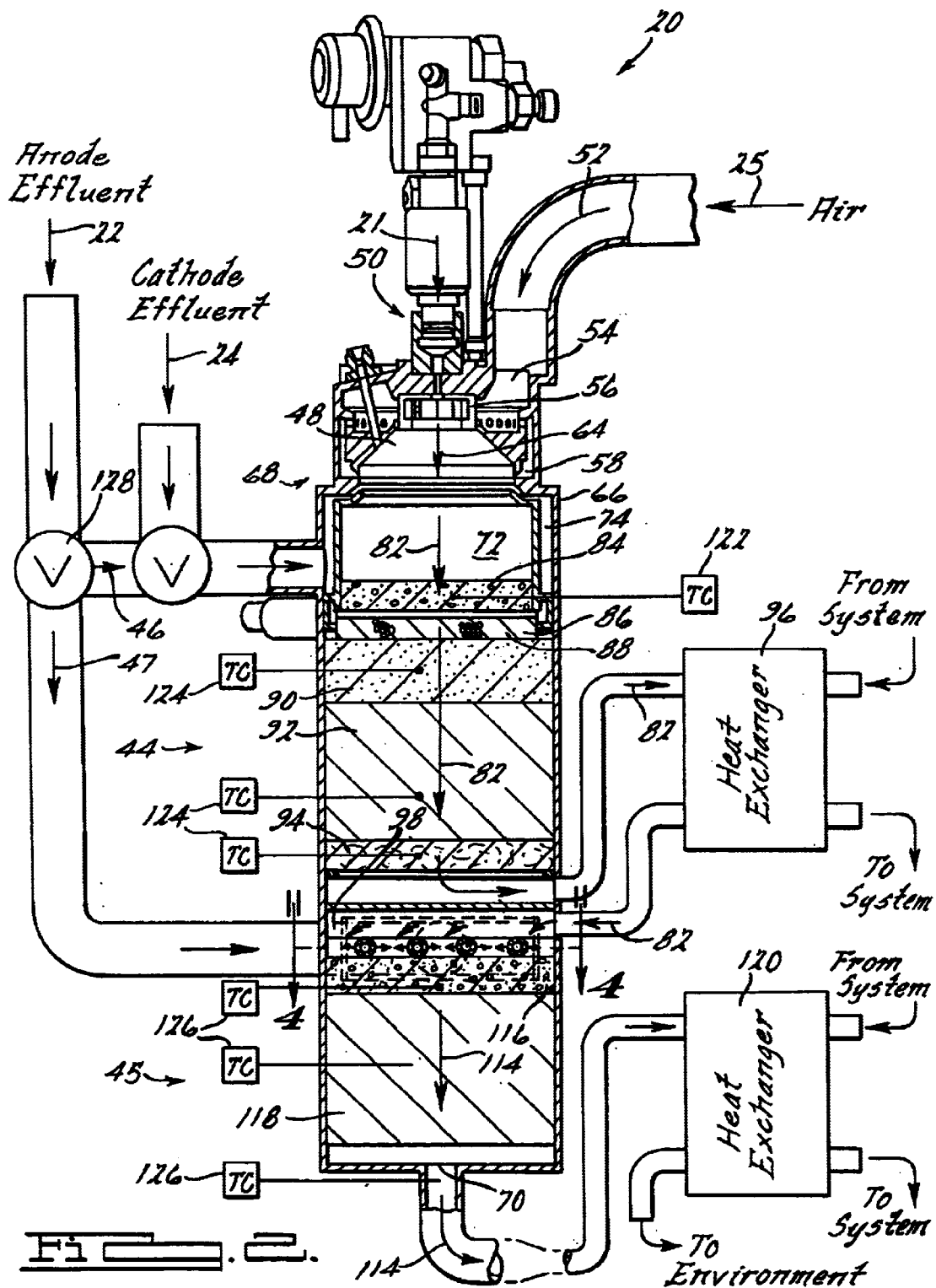
FIG. 2 is a cross-sectional view of a different combustor according to a second preferred embodiment of the present invention.

Referring now to FIGS. 1 and 2, the combustor 20 has a chamber 48 for receiving liquid fuel 21. A fuel injector 50 meters the liquid fuel 21 so that a known quantity of liquid fuel 21 is supplied to the chamber 48. An oxidant flow 52 is also supplied to chamber 48 to mix with the liquid fuel 21. The oxidant flow can be in the form of air flow 25 and/or cathode effluent 24 as shown in FIG. 1. The term oxidant feed stream is used herein to generally describe the oxygen feed supplied to the combustor 20 and encompasses cathode effluent 24, air flow 25 or any combination thereof. For simplicity in explaining the operation of the combustor 20, the oxidant flow will be referred to as air flow 25 hereinafter, however, it should be understood that the oxidant flow 52 can be formed from air flow 25, cathode effluent 24 or a combination thereof regardless of the use of the term air flow 25 to describe oxidant flow 52. The liquid fuel 21 exits the fuel injector 50 in an onion-shaped flow pattern that is then pulled apart by air flow 25 delivered via port 54 into chamber 48. The air flow 25 delivered via port 54 is split into two stages. The first stage of air flow 25 is injected tangentially in region 56 in order to induce high shear to break up the onion-shaped liquid fuel 21 into a fine mist of particles in chamber 48. The second stage of the air flow 25 supplied from port 54 is radially injected into chamber 48 through gap 58. Alternatively, the second stage of the air flow 25 could be radially injected through orifices (not shown) spaced around the circumference of chamber 48 rather than through the gap 58. Optionally, as was stated above, the air flow 25 supplied to chamber 48 via port 54 can be supplied partially or entirely from the cathode effluent 24 via line 60. In this case, control valves 62 are positioned on line 60 to control the fluid that is supplied to chamber 48 via port 54.

Figure 3:
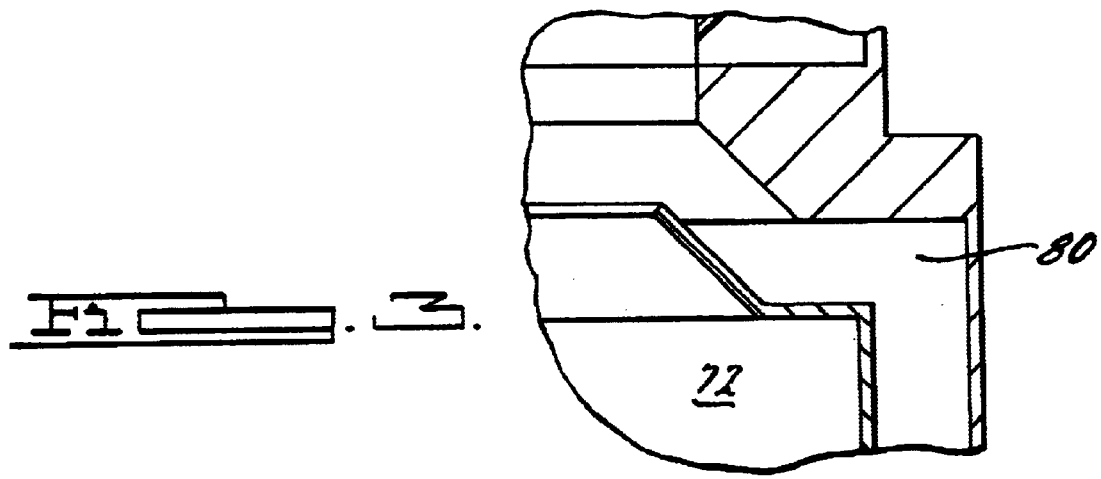
FIG. 3 is a close up cross-sectional view of a passageway of the combustor of FIG. 1 taken along line 3—3.

The combustor 20 has a generally cylindrical shell 66 with an inlet 68 and an outlet 70. The inlet 68 of the combustor 20 leads to a primary mixing chamber 72. The primary mixing chamber 72 receives the liquid fuel/air mixture 64 from chamber 48. The primary mixing chamber 72 also receives a first portion 46 of the anode effluent 22 and the cathode effluent 24. The first portion 46 flows into an annular chamber 74 via port 76. The cathode effluent 24 also flows into the annular chamber 74 via port 76 in the configuration shown in FIG. 2 or via port 78 in the configuration shown in FIG. 1. The first portion 46 and the cathode effluent 24 mix together in the annular chamber 74 and flow into the primary mixing chamber 72 via passageway 80, as shown in FIG. 3. The liquid fuel/air mixture 64, the first portion 46 and the cathode effluent 24 mix together in the primary mixing chamber 72 to form a first stage flow stream 82.

The first stage flow stream 82 then flows through a distribution media 84 that is a porous bed which provides a tortuous path therethrough to promote turbulent flow and intimate mixing of the various components of the first stage flow stream 82 before exiting the distribution media 84. Preferably, the first stage flow steam 82 exits the distribution media 84 as a homogeneous flow. Preferably, the distribution media 84 is a 40 ppi (pore per linear inch) reticulated foam structure made of YZA (Yttria-Zirconia-Aluminia), although the distribution media 84 could also be made from many alternate materials, such as, silicon carbide or zironia-toughened aluminia, or alternate structures, such as, a woven metal matrix, parallel channel monolith, sintered metal series of screens, etc. depending upon the mixing and distribution requirements, as will be apparent to those skilled in the art.

The first stage flow stream 82 then passes through a heating element 86. As presently preferred, the heating element 86 is an electrically heated structure 86 that supplies heat to vaporize any liquids, such as the liquid fuel 21, within the first stage flow stream 82. Optionally, but preferably, the electrically heated structure 86 also contains a catalyst and is an electrically heated catalyst 88. Preferably, the electrically heated catalyst 88 is a metal honeycomb structure with density of about 350 cpsi (cells per square inch) with a palladium catalyst, although other precious metals are possible, as will be apparent to those skilled in the art. The electrically heated catalyst 88 along with vaporizing the liquids initiates the catalytic reaction of the first stage flow stream 82. The amount of heat produced by the electrically heated catalyst 88 is adjustable and can be varied depending upon the needs of the combustor 20 and the system within which the combustor 20 is employed, as will be discussed in more detail below.

The first stage flow stream 82 then flows through an optional, but preferred, light-off catalyst 90. Preferably, the light-off catalyst 90 is a 40 ppi reticulated foam that uses a platinum/palladium catalyst, although alternate precious metals or combinations of such are possible depending on the application requirements and the economic tradeoff at the time of inception, as will be apparent to those skilled in the art. Alternate geometry foams or structures are also possible, such as described above in relation to the distribution media 84, with the desire to induce turbulence and improve reaction stability.

The first stage flow stream 82 then passes through a first main catalyst 92. The first main catalyst 92 is preferably a 600 cpsi parallel channel monolith made of cordiorite with similar catalyst as described for the light-off catalyst 90. The first main catalyst 92 can also be made of alternate materials or geometric configurations, such as described with relation to the light-off catalyst 90. The first stage flow stream 82 reacts within the first main catalyst 92 to combust the hydrogen within the first stage flow stream 82 and produces heat.

The first stage flow stream 82 then passes through an uncatalyzed radiant shield 94. Preferably, the radiant shield 94 is a 400 cpsi parallel channel uncatalyzed cordiorite monolith or a reticulated foam similar to the distribution media 84. The radiant shield 94 acts to minimize ignition of downstream flows (minimize conditions which allow hot spots within the catalysts) by preventing back flow of potentially combustible mixtures to the upstream main catalyst 92 which could act as an ignition source.

The first stage flow stream 82 then exits the first stage 44 of the combustor 20 and either flows directly to the second stage 45 of the combustor 20, as shown in FIG. 1, or alternatively, flows through a heat exchanger 96 and then into the second stage 45 of the combustor 20, as shown in FIG. 2. When the first stage flow stream 82 flows through a heat exchanger 96, the heat exchanger 96 extracts heat from the first stage flow stream 82 for use in meeting a heat demand of the system. The heat demand placed upon the heat exchanger 96 will vary depending upon the needs of the system.

The first stage flow stream 82 enters a second primary mixing chamber 98 in the second stage 45 of the combustor 20. The second portion 47 of the anode effluent flow 22 also flows into the second primary mixing chamber 98 to mix with the first stage flow stream 82. The second portion 47 can be supplied to the second primary mixing chamber 98 in a variety of ways. For example, as can be seen in FIG. 1, the second portion 47 can flow into an annular chamber 100 via port 102 and then enter the second primary mixing chamber 98 via openings 104 located around the periphery of the annular chamber 100. Preferably, the openings 104 are spaced about the periphery of the annular chamber 100 to facilitate the mixing of the second portion 47 with the first stage flow stream 82 when entering the second primary mixing chamber 98.

Figure 4:
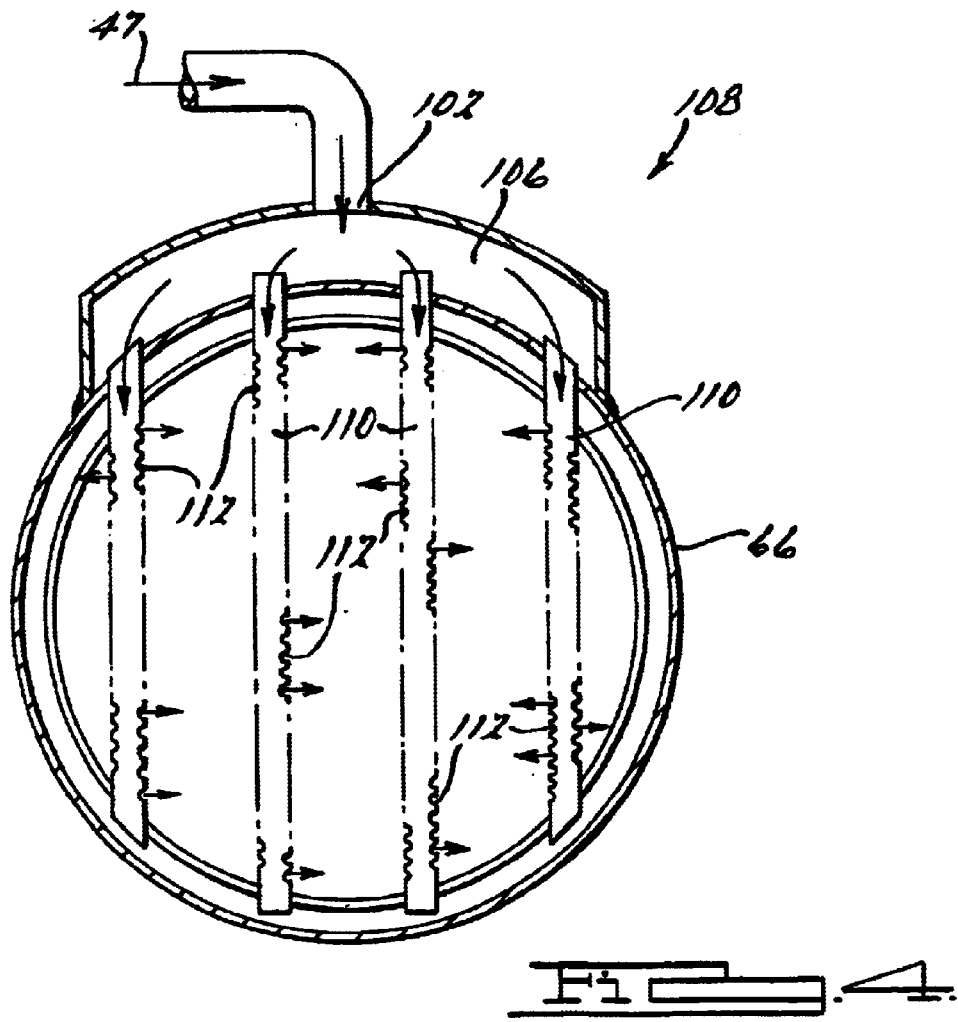
FIG. 4 is a partial cross-sectional view of the combustor of FIG. 2 taken along line 4—4 showing the use of a distribution rack to inject an anode effluent into the combustor.

Alternatively, as can be seen in FIGS. 2 and 4, the second portion 47 can flow into a manifold 106 in an injection rack 108. The injection rack 108 is positioned within the second primary mixing chamber 98 and has a plurality of generally parallel tubes 110 that extend across the second primary mixing chamber 98. Each tube 110 is in fluid communication with the manifold 106 and receives the second portion 47 of anode effluent flow 22. Each tube 110 has a plurality of openings 112 that are spaced along the tubes 110 and through which the second portion 47 enters the second primary mixing chamber 98. Preferably, the openings 112 are positioned on the tubes 110 so that the openings 112 on adjacent tubes 110 face one another and the second portion 47 forms a curtain or film of anode effluent that extends across the second primary mixing chamber 98. The first stage flow stream 82 then flows through the curtain of second portion 47 of anode effluent flow 22 and mixes therewith in the second primary mixing chamber 98.

The mixing of the first stage flow stream 82 and the second portion 47 in the second primary mixing chamber 98 forms a second stage flow stream 114. The second stage flow stream 114 flows from the second primary mixing chamber 98 through a second distribution media 116. The second distribution media 116 is the same as the distribution media 84 in the first stage 44 of the combustor 20, with the exception of its size, which may vary. That is, the size of the second distribution media 116 may vary depending upon the amount of mixing of the second stage flow stream 114 required in the second distribution media 116. Preferably, the second stage flow stream 114 exits the second distribution media 116 as a generally homogeneous stream.

The second stage flow stream 114 then passes through a second primary catalyst 118. The second primary catalyst 118 is preferably a 600 cpsi parallel channel monolith made of cordiorite with a similar catalyst as described for the first main catalyst 92 and the light-off catalyst 90. The second stage flow stream 114 reacts within the second primary catalyst 118 to combust the hydrogen within the second stage flow stream 114 and produce heat.

The second stage flow stream 114 exits the second primary catalyst 118 and flows through outlet 70 and through heat exchanger 120 that is used to extract heat from the second stage flow stream 114 to meet a heat demand of the system within which the combustor 20 is employed. The second stage flow stream 114 is then exhausted to the environment. The exhausted second stage flow stream 114 preferably contains little or no unused hydrogen.

The operation of the combustor 20 will now be described. During a start-up of the system within which the combustor 20 is employed, the system may or may not be producing anode effluent 22 and, if available, may contain little or no hydrogen to be catalytically combusted within the combustor 20 to meet a heat demand placed on the combustor 20 by the system. Therefore, during start-up the combustor 20, depending upon the availability of anode effluent 22 and the amount of hydrogen contained therein, may exclusively or supplementally use liquid fuel 21 to provide a start-up fuel so that the combustor 20 can generate heat and meet a heat demand placed on the combustor 20.

Liquid fuel 21 is metered into chamber 48 via the fuel injector 50 and air flow 25 is supplied to chamber 48 via port 54. Preferably, during the start-up all the air flow 25 is supplied to the inlet mixing chamber 48 via port 54. The liquid fuel/air mixture 64 then flows into the primary mixing chamber 72 wherein a first portion 46 of anode effluent 22 and/or cathode effluent 24 can also be mixed with the liquid fuel/air mixture 64. However, as stated above, during the start-up of the system and of the combustor 20, little or no anode and cathode effluents 22, 24 are expected to be available. The liquid fuel/air mixture 64 and any anode and/or cathode effluents 22, 24 supplied to the primary mixing chamber 72 mix together and form the first stage flow stream 82. The first stage flow stream 82 then flows through the distribution media 84 where it is thoroughly mixed and preferably emerges as a generally homogeneous flow.

The first stage flow stream 82 then enters into the electrically heated catalyst 88. The electrically heated catalyst 88 is heated via electricity to a temperature that vaporizes the first stage flow stream 82 so that no liquid fuel exits the electrically heated catalyst 88. Additionally, the electrically heated catalyst 88 also initiates the catalytic reaction of the first stage flow stream 82. The first stage flow stream 82 then passes through the light-off catalyst 90, the first main catalyst 92, the radiant shield 94 and on to the second primary mixing chamber 98 in the second stage 45 of the combustor 20 either directly or through the optional heat exchanger 96. Upon entering the second primary mixing chamber 98, the first stage flow stream 82 will mix with the second portion 47 of anode effluent 22, although little or no anode effluent is expected to be available, to form a second stage flow stream 114. The second stage flow stream 114 is then mixed within the second distribution media 116 and flows through the second primary catalyst 118 through the heat exchanger 120 and then exhausted to the environment.

During the start-up of the combustor 20, the first stage flow stream 82 catalytically combusting in the electrically heated catalyst 88, the light-off catalyst 90 and the first main catalyst 92 will produce heat that will transfer throughout the combustor 20 and increase the temperature throughout the combustor 20. As a result, the temperature within the primary mixing chamber 72 and the distribution media 84 will increase. Eventually, the temperature within the distribution media 84 will reach a temperature sufficient for the liquid fuel 21 within the first stage flow stream 82 to vaporize as the first stage flow stream 82 passes through distribution media 84 such that the electrically heated catalyst 88 will no longer need to be heated to cause the liquid fuel 21 to vaporize. Preferably, the distribution media 84 has a thermocouple 122 embedded within the distribution media 84 or, alternatively, positioned adjacent the distribution media 84 so that the temperature of the distribution media 84 is known during the operation of the combustor 20. Based on the temperature of the distribution media 84, the electric current flowing to the electrically heated catalyst 88 is adjusted as needed to supply heat to vaporize the liquids within the first stage flow stream 82. Therefore, after operating the combustor 20 for a sufficient length of time, the electrically heated catalyst 88 in most conditions can be turned off and the back radiation and conduction from the heat of reaction of the first stage flow stream 82 in the electrically heated catalyst 88, light-off catalyst 90 and the first main catalyst 92 will support liquid vaporization within the distribution media 84. While the measuring of the temperature of the distribution media 84 is discussed as being performed by the use of a temperature sensor 122, such as a thermocouple, it should be understood that a variety of means of measuring or predicting the temperature within the distribution media 84, as will be apparent to those skilled in the art, can be employed without departing from the scope of the invention as defined by the claims. It should also be understood that temperatures at other locations within the first stage 44 of the combustor 20 can be measured and used to control the operation of the electrically heated catalyst 88, as will be apparent to those skilled in the art, and still be within the scope of the invention as defined by the claims.

As the amount of fuel ($H_2$) contained within the anode effluent 22 increases, the combustor 20 can operate with decreasing amounts of liquid fuel 21. As a result, the amount of liquid fuel 21 supplied to the combustor 20 is decreased as the amount of hydrogen contained within the anode effluent 22 increases to the point where the need for liquid fuel 21 in the combustor 20 to meet the heat demands placed on the combustor 20 is eliminated. When this state is reached, liquid fuel 21 is no longer supplied to the combustor 20. However, it should be understood that there may be periods of operation of the combustor 20, such as when exceptionally high heat demands are placed upon the combustor 20 or when the amount of $H_2$ within the anode effluent 22 is insufficient. In such circumstances, it would be desirable to inject liquid fuel 21 into the combustor 20 to supplement the anode effluent 22 and increase the amount of heat generated by the combustor 20. Accordingly, the combustor 20 is designed to run on the anode effluent 22, the liquid fuel 21, and/or a mixture of the anode effluent 22 and the liquid fuel 21 at any time. The combustor 20 is operated to consume a majority, and preferably substantially all, of the unused hydrogen contained within the anode effluent 22 so that no unused hydrogen is exhausted from the combustor 20. Therefore, it is preferred to minimize the use of liquid fuel 21 so that most or all of the liquid fuel 21 and hydrogen in the anode effluent 22 is consumed in the combustor 20.

Preferably, the cathode effluent 24 supplied to the combustor 20 is sufficient to oxidize all the hydrogen contained in the anode effluent 22 and any liquid fuel 21 supplied to the combustor 20. However, the combustor 20 can also be supplied with air flow 25 through the port 54, as was described above, to supplement the cathode effluent 24, to achieve complete combustion.

When the combustor 20 and the system within which the combustor 20 is employed are fully operational, the combustor 20 consumes all of the anode effluent 24 and any liquid fuel 21 injected into the combustor 20 using the cathode effluent 24 and/or air flow 25. The anode effluent 22 is proportioned into a plurality of portions of anode effluent flows depending upon how the combustor 20 is to be operated. For example, it may be desired to prevent the hydrogen concentration within the first stage flow stream 82 and/or the second stage flow stream 114 from having a sufficient concentration of hydrogen that the temperature within the respective first and second stages 44, 45 of the combustor 20 causes the first and/or second stage flow streams 82, 114 to autoignite. Alternatively, it may be desired to operate the combustor 20 with a specific temperature distribution or profile so that various heat demands placed on the combustor 20 are met and/or distributed throughout the combustor 20.

To operate the combustor 20 so that autoignition of the first and/or second stage flow streams 82, 114 is minimized and/or prevented, one or more temperature sensors 124, such as thermocouples, are positioned within the first stage 44 of the combustor 20 so that the temperature within the first stage 44 is known. The temperature at which the first stage flow stream 82 will autoignite depends upon the operating conditions of the combustor 20 and the amount of hydrogen contained within the first stage flow stream 82, as will be apparent to those skilled in the art. The amount of anode effluent contained within the first portion 46 of anode effluent 22 is proportioned so that the concentration of hydrogen within the first stage flow stream 82 is below a concentration that will autoignite at the measured temperature of the first stage 44 of the combustor 20. For example, thermocouple 124 can be positioned within the light-off catalyst 90. Based on the measured temperature, the amount of anode effluent 22 in the first portion 46 will be controlled by valve 128 so that the hydrogen concentration is below the autoignition level at the measured temperature. The remaining anode effluent is proportioned to other stages of the combustor 20. By preventing the first stage flow stream 82 from autoigniting within the combustor 20, damage to the components of the combustor can be avoided. Additionally, the distribution media 84 may not need to provide as much or any flame suppression as is the case in conventional prior art combustors. As a result, the distribution media 84 can be configured and adapted to provide a generally homogeneous first stage flow stream 82 without the high pressure drop associated with a conventional design which require substantial flame arresting characteristics.

It is also desirable to prevent the second stage flow stream 114 from autoigniting within the second stage 45 of the combustor 20. Therefore, like the first stage 44, the second stage 45 can also have one or more temperature sensors 126, such as thermocouples, distributed throughout the second stage 45 of the combustor 20 so that the temperature within the second stage 45 is known. The amount of anode effluent contained within the second portion 47 of anode effluent flow 22 is proportioned to prevent autoignition of the second stage flow stream 114. For example, thermocouple 126 can be placed in the second primary catalyst 118 and the amount of anode effluent 22 proportioned to the second portion 47 adjusted based on the measured temperature. The proportioning of the anode effluent flow 22 into the plurality of portions is controlled by control valve 128 that operates to divide the anode effluent 22 into appropriate amount of first and second portions 46, 47. Depending upon the design of the combustor 20 and the number of stages therein, multiple control valves 128 may be employed to proportion the anode effluent 22. The number of stages will depend on concentrations, and the means to extract heat from the stream inbetween or within stages.

Instead of using control valve 128 to proportion the anode effluent, one or more orifice plates (not shown) can be used. The orifice plates are selected so that a desired ratio or proportioning of the anode effluent 22 is achieved. However, static orifice plates will not allow dynamic control of the proportioning of the anode effluent 22 and, as such, the use of control valve 128 is presently preferred. Additionally, it should be understood that other means of proportioning the anode effluent 22, as will be apparent to those skilled in the art, can be employed and still be within the scope of the invention as defined by the claims.

Because the proportioning of the first and second stage flow stream 82, 114 can vary and the temperatures within the first and second stages 44, 45 the combustor 20 can also vary, the radiant shield 94 in the first stage 44 preferably minimizes conditions which allow for hot spots within the first main catalyst 92 to cause ignition of the second stage flow stream 114. The radiant shield 94 functions by preventing back flow of the second stage flow stream 114 into the upstream first main catalyst 92, which could act as an ignition source. Preferably, the operation of the first stage 44 of the combustor 20 is controlled so that the temperature of the first stage flow stream 82 entering the second primary mixing chamber 98 is below the autoignition temperature of the second portion 47 of anode effluent 22 so as to minimize autoignition and hot spots within downstream stage(s).

The temperature of the first stage flow stream 82 entering the second primary mixing chamber 98 can be controlled in a number of ways. For example, the amount of anode effluent 22 contained within the first portion 46 can be controlled based upon the temperature of the first stage flow stream 82 exiting the first main catalyst 92. Preferably, as shown in FIG. 2, the first stage flow stream 82 can go through heat exchanger 96 prior to entering the second primary mixture chamber 98. The heat exchanger 96 extracts heat from the first stage flow stream 82 so that the temperature of the first stage flow stream 82 entering the second primary mixing chamber 98 is below the autoignition temperature of the second portion 47 of anode effluent 22.

The combustor 20, as was mentioned above, can be operated so that various heat demands placed upon the combustor 20 are met. The anode effluent 22 is proportioned so that the various heat exchangers that extract heat from the combustor 20 can each meet the heat demand placed upon the heat exchangers. For example, as shown in FIG. 2, the amount of anode effluent 22 that is proportioned to the first stage 44 can be adjusted so that the temperature of the first stage flow stream 82 flowing through the heat exchanger 96 is sufficient to meet the heat demand placed upon the heat exchanger 96. Liquid fuel 21 can also be supplied to the first stage 44 to meet the heat demand placed on heat exchanger 96. The amount of anode effluent 22 that is proportioned to the second stage 45 can also be adjusted so that the temperature of the second stage flow stream 114 flowing through the second heat exchanger 120 is sufficient to meet the heat demand placed upon the second heat exchanger 120. In this manner, the combustor 20 can be operated to meet the various heat demands placed upon the combustor 20.

As stated above, liquid fuel 21 can be injected into the first stage 44 of the combustor 20 to supplement the amount of hydrogen contained within the first stage flow stream 82 so that the combustor 20 can meet the various heat demands. For example, when the heat demand placed upon the first heat exchanger 96 is greater than the amount of heat that can be generated by routing all of the anode effluent 22 to the first stage 44 of the combustor 20, liquid fuel 21 can be injected into the first stage 44 of the combustor 20 to meet the heat demand placed upon the first heat exchanger 96. Similarly, if the heat demand placed upon the second heat exchanger 120 requires that all of the anode effluent 22 be proportioned to the second stage 45, liquid fuel 21 can be injected into the first stage 44 so that the first stage flow stream 82 can generate sufficient heat to meet the heat demands placed upon the first heat exchanger 96.

While the combustor 20 has been shown as having two stages 44, 45 and two heat exchangers 96, 120 associated with the respective first and second stages 44, 45, it should be understood that the combustor 20 can have more than two stages and can also have more than two heat exchangers and still be within the scope of the invention as defined by the claims. Furthermore, it should be understood that there can be more than one heat exchanger for each stage of the combustor 20, as will be apparent to those skilled in the art, and still be within the scope of the invention as defined by the claims.

Preferably, the combustor 20 is designed so that the first and second stages 44, 45 can be operated to simultaneously meet the various heat demands placed upon the combustor 20 and avoid autoignition of the first and second flow streams 82, 114 within the combustor 20. That is, the combustor 20 can preferably meet the heat demands placed upon the combustor 20 without autoignition occurring within the combustor 20.

The above-described combustor 20 and operation of the same enables excess fuel contained within an anode effluent 22 to be catalytically combusted within the combustor 20 to provide useful energy. The combustor 20 can be controlled so that no fuel streams within the combustor 20 autoignite and no flammable combustion occurs. Additionally, the combustor 20 can be operated so that no hot spots occur in any of the catalysts within the combustor 20 so that the life span of the combustor and the catalysts can be increased. Because the combustor 20 can be operated so that the flows within the combustor 20 do not autoignite, flame suppressors, if any, within the combustor 20 do not need to be as substantial as in conventional combustors and, as a result, a pressure drop across the flame suppressors will be reduced and result in a more efficient combustor 20. Additionally, the combustor 20 can be operated so that heat demands placed upon different stages of the combustor 20 can be met.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A catalytic combustion device for use with a fuel cell comprising:
   a first section that receives an oxidant feed stream and a first portion of an anode effluent stream from said fuel cell, said oxidant feed stream and said first portion of said anode effluent stream mixing together in said first section to form a first stage flow stream;
   a second section downstream from said first section, said second section having a first main catalyst, said second section receiving said first stage flow stream from said first section and directing said first stage flow stream through said first main catalyst;
   a third section downstream from said second section, said third section receiving said first stage flow stream from said second section, and a second portion of said anode effluent stream from said fuel cell, said first stage flow stream mixing with said second portion of said anode effluent stream in said third section to form a second stage flow stream; and
   a fourth section downstream from said third section, said forth section having a second main catalyst, said forth section receiving said second stage flow stream from said third section and directing said second stage flow stream through said second main catalyst.

2. The combustion device of claim 1, wherein said oxidant flow stream is from a fuel cell.

3. The combustion device of claim 1, wherein said first and second portions of said anode effluent steam are an entire portion of said anode effluent stream from said fuel cell.

4. The combustion device of claim 1, further comprising at least one control valve that proportions said anode effluent steam into said first and second portions.

5. The combustion device of claim 1, further comprising at least one orifice plate that proportions said anode effluent stream into said first and second portions.

6. The combustion device of claim 1, wherein said first section further comprises a first porous foam member through which said first stage flow stream is passed, said first foam member mixing said oxidant feed stream and said first portion of said anode effluent stream together to form a generally homogenous first stage flow stream.

7. The combustion device of claim 6, wherein said third section further comprises a second porous foam member through which said first stage flow stream and said second portion of said anode effluent stream is passed, said second foam member mixing said first stage flow stream and said second portion of said anode effluent stream together to form a generally homogenous second stage flow stream.

8. The combustion device of claim 1, wherein said third section further comprises a porous foam member through which said first stage flow stream and said second portion of said anode effluent stream is passed, said foam member mixing said first stage flow stream and said second portion of said anode effluent stream together to form a generally homogenous second stage flow stream.

9. The combustion device of claim 1, further comprising a light-off section interposed between said first and second sections, said light-off section containing a light-off catalyst, said light-off section receiving said first stage flow stream from said first section and directing said first stage flow stream through said light-off catalyst and into said second section.

10. The combustion device of claim 1, further comprising a flame suppression section interposed between said second and third sections, said flame suppression section containing a flame suppression element, said flame suppression section receiving said first stage flow stream from said second section and directing said first stage flow stream through said flame suppression element and into said third section.

11. The combustion device of claim 1, further comprising a heating section interposed between said first and second sections, said heating section containing a selectively operable heating element, said heating section receiving said first stage flow stream from said first section and directing said first stage flow stream through said heating element and into said second section, and selective operation of said heating element causing said first stage flow stream to be selectively heated as said first stage flow stream passes through said electrically heated structure.

12. The combustion device of claim 11, wherein said heating element is operated during a start-up phase of the combustion device.

13. The combustion device of claim 11, wherein said heating element comprises an electrically heated catalyst and said first stage flow stream begins a catalytic reaction as said first stage flow stream passes through said electrically heated catalyst.

14. The combustion device of claim 1, wherein said oxidant feed stream and said first portion of said anode effluent stream are mixed together prior to entering said first section.

15. The combustion device of claim 14, wherein said oxidant feed stream and said first portion of said anode effluent stream are mixed together in an annular section that surrounds a portion of said first section prior to entering said first section.

16. The combustion device of claim 14, wherein said mixed oxidant feed stream and said first portion of said anode effluent stream are injected into said first section through a plurality of inlets spaced about a periphery of said first section.

17. The combustion device of claim 1, wherein said second portion of said anode effluent stream is injected into said third section through a plurality of inlets spaced about a periphery of said third section.

18. The combustion device of claim 1, further comprising a rack of generally parallel members positioned in said third section, each of said members each having a plurality of openings that communicate with said third section and directing said second portion of said anode effluent stream through said openings and into said third section.

19. The combustion device of claim 18, wherein a portion of said openings on each of said members oppose openings on an adjacent member so that said second portion of said anode effluent flow forms a fluid curtain across a cross-section of said third section.

* * * * *